(12) United States Patent
Phillips

(10) Patent No.: US 7,966,571 B2
(45) Date of Patent: Jun. 21, 2011

(54) METHODS, APPARATUS AND COMPUTER PROGRAMS FOR NAVIGATING WITHIN A USER INTERFACE

(75) Inventor: Mark Richard Phillips, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1044 days.

(21) Appl. No.: 11/677,086

(22) Filed: Feb. 21, 2007

(65) Prior Publication Data

US 2007/0209007 A1 Sep. 6, 2007

(30) Foreign Application Priority Data

Mar. 1, 2006 (GB) .................................. 0604094.3

(51) Int. Cl.
*G06F 3/048* (2006.01)
*G06F 3/01* (2006.01)
(52) U.S. Cl. ....................................... 715/784; 715/702
(58) Field of Classification Search .................. 715/784, 715/786, 787, 781, 738, 772, 702
See application file for complete search history.

(56) References Cited

U.S. PATENT DOCUMENTS

| 5,726,687 | A | * | 3/1998 | Belfiore et al. | ............... 715/785 |
| 6,714,221 | B1 | * | 3/2004 | Christie et al. | ................ 715/784 |
| 6,826,553 | B1 | * | 11/2004 | DaCosta et al. | .................. 707/1 |
| 6,865,718 | B2 | * | 3/2005 | Levi Montalcini | ........... 715/786 |
| 6,956,591 | B2 | * | 10/2005 | Lundin et al. | ................. 345/684 |
| 6,975,306 | B2 | * | 12/2005 | Hinckley et al. | .............. 345/173 |
| 2003/0156141 | A1 | * | 8/2003 | Good et al. | .................... 345/810 |
| 2003/0226104 | A1 | * | 12/2003 | Blazejewski et al. | ...... 715/501.1 |
| 2005/0091604 | A1 | * | 4/2005 | Davis | ............................ 715/772 |
| 2005/0246619 | A1 | * | 11/2005 | Krause | .......................... 715/500 |
| 2007/0079246 | A1 | * | 4/2007 | Morillon et al. | .............. 715/741 |

* cited by examiner

*Primary Examiner* — Ryan F Pitaro
*Assistant Examiner* — Rashawn Tillery
(74) *Attorney, Agent, or Firm* — Law Office of Jim Boice

(57) ABSTRACT

A method, apparatus and computer program are disclosed for navigating within a user interface. Navigation within the user interface is monitored and, if detected navigation instructions satisfy a predefined criterion such as if they exceed a predefined rate of movement, one or more return points or bookmarks within the user interface are recorded to facilitate return to those positions.

19 Claims, 3 Drawing Sheets

METHODS, APPARATUS AND COMPUTER PROGRAMS FOR NAVIGATING WITHIN A USER INTERFACE

FIELD OF INVENTION

The present invention relates to a method or apparatus for navigating within a user interface of a data processing apparatus, and in particular for helping a user to return to particular positions within a displayed set of data.

BACKGROUND OF THE INVENTION

Display devices used in equipment such as computers or mobile telephones are used to display sets of data. Such sets of data in the form of documents, web pages or program menus are often too large for the whole set to be displayed on the display device at any given time. Display devices therefore provide controls in the form of scroll bars or specialised keys on an associated keyboard to allow input of user commands to change the portion of the set of data being displayed. These user commands enable a user to move through or navigate the set of data. The commands commonly enable a user to navigate a set of data incrementally by line, paragraph, or page, or to jump to the start or the end of the set of data. Some application programs provide search facilities which enable automatic navigation to each successive occurrence of a search term.

When a user has carried out one or more navigation steps, a return to a previously displayed position in the set of data can be affected by further user commands which effectively reverse the original navigation steps. However, such a procedure is both time consuming and awkward. Some application programs enable a user to manually log return positions or bookmarks in a set of data which can be returned to using specific user commands. Other application programs are arranged to enter such return positions or bookmarks automatically at points in a set of data which are viewed for a time exceeding a predetermined threshold. One problem with the automatic insertion of return positions based on a time threshold is that it assumes that a users attention is evenly applied to set of data being displayed. If, for example, the user is distracted from the display device for longer than the predetermined threshold and part-way through scrolling though a document, then a return point would be logged at the point. Such a return point may be unwanted. In other words, return points in such a system do not necessarily reflect significant points in a user's navigation of the set of data.

SUMMARY OF THE INVENTION

A first aspect of the present invention provides a method for navigating within a user interface of a data processing apparatus, comprising the steps of: detecting a user-initiated navigation instruction for navigating from a first position within the user interface to a second position; determining whether the navigation instruction satisfies a predefined criterion; and, in response to the navigation instruction satisfying the predefined criterion, recording the first position to enable a user to return to the first position by initiating a predefined return instruction.

A first embodiment provides a method for navigating data displayed on a display device, the method comprising the steps of: displaying data from a first position in a set of data; detecting movement from the first position to a second position in the set of data, the movement being made in response to one or more navigation commands; determining the rate of the movement; and, if the rate of the movement exceeds a predetermined threshold, recording the first position to enable return to the first position in response to a predefined user command.

Preferably the method comprises the further step of: redisplaying the data from the first position in response to the predefined user command. The first position may be stored as a candidate return position prior to detecting the movement. The first position may be the position in the set of data at which the data is first displayed to the user, or the first position may be any other position from which the user initiates a movement. The first position may be recorded only if the data has been displayed to the user at the first position for longer than a predefined threshold time period.

The steps of detecting, determining and recording may be repeated for further positions in the set of data, resulting in a plurality of positions being recorded. The user may then be able to initiate a return to the latest-recorded position, or all of the recorded positions may be selectable to enable the user to return to any one of those positions, in response to predefined user commands. The plurality of positions may be displayed for selection by the user in relative time or position order. The set of data may comprise one or more documents.

The rate of movement may be calculated directly from the navigation commands. The first position and the second position may be recorded and marked so as to be identifiable to the user as the start and end respectively of a movement which exceeds a predefined threshold.

In a second aspect of the invention, there is provided an apparatus for navigating within a user interface of a data processing apparatus. The apparatus comprises: means for presenting a user interface; means for detecting a user-initiated navigation instruction for navigating from a first position within the user interface to a second position; means for determining whether the navigation instruction satisfies a predefined criterion; and means, responsive to the navigation instruction satisfying the predefined criterion, for recording the first position to enable a user to return to the first position by initiating a predefined return instruction. The means for presenting a user interface may comprise a computer program implementation of a user interface, a display device or a combination of a computer program and a hardware device.

An embodiment of the invention comprises computer program code (which may comprise one or a set of associated programs) implementing the means for detecting, determining and recording. Such computer program code may implement a set of instructions for controlling a data processing apparatus to perform a method as described above.

BRIEF DESCRIPTION OF THE DRAWINGS

Embodiments of the invention are described below in more detail, by way of example, with reference to the accompanying drawings in which.

DETAILED DESCRIPTION OF EMBODIMENTS OF THE INVENTION

Figure 1:
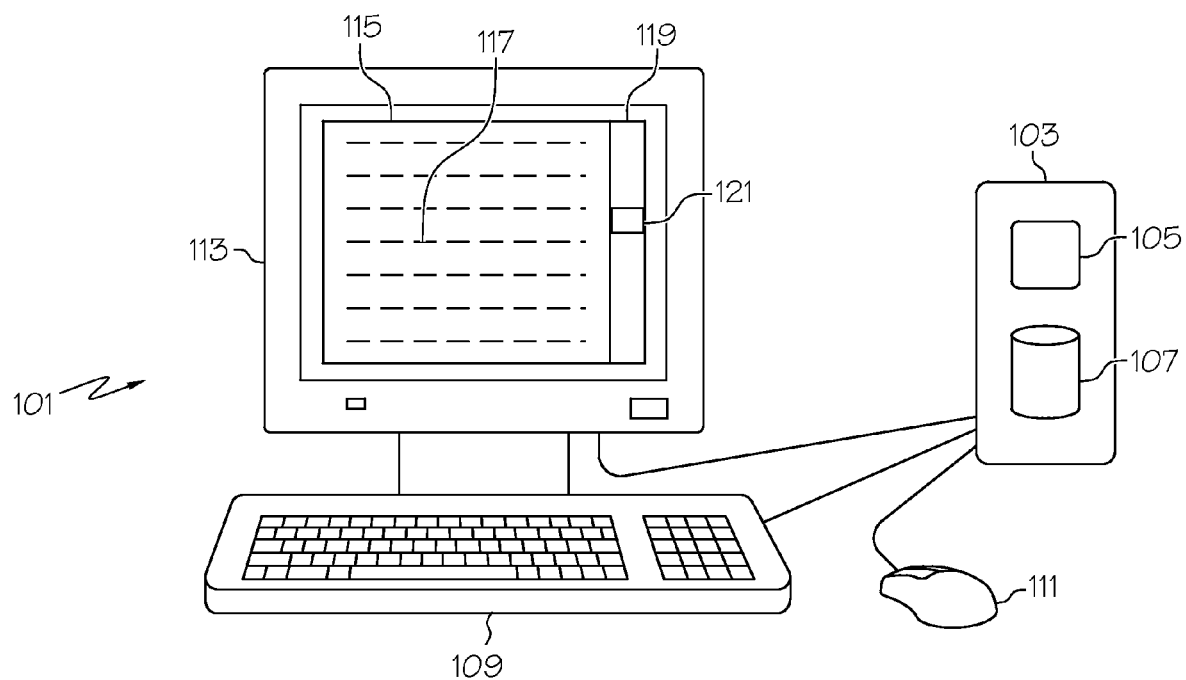
FIG. 1 is a schematic illustration of a computer system.

With reference to FIG. 1, a computer system 101 comprises a computer 103 having a processor 105 and storage device 107 in the form of a disk drive. The processor 105 runs an operating system (OS) and one or more application programs which utilise sets of data stored on the storage device 107. The computer 103 takes inputs in the form of user commands via a connected keyboard 109 and mouse 111. The computer is also connected to a display device 113 in the form a screen or monitor. The display device is used by the application programs to display the sets of data stored on the storage device 107. In the present embodiment, one of the application programs is a word processing program which, in co-operation with the OS, uses a window 115 to display a set of data in the form of a word processing document 117. The window 115 comprises a scroll bar 119 and a slider 121.

The document 117 comprises more data than can be displayed on the display device 113 at any given time. Accordingly, the application program is arranged to receive user commands via the keyboard 109 or mouse 111 to cause different parts of the document 117 to be displayed. In other words, the user can issue commands to move through or navigate the document 117. The user commands input via the keyboard include scrolling up or down by line, paragraph or page, jumping to the start or end of the document and using a search function to find successive occurrences of an input search term in the document. The mouse 111 is also arranged to enable navigation of the document by manipulation of the slider 121 or by clicking away from the slider within the scroll bar 119. Further navigation commands may also be input to the word processing program via menus (not shown) provided by the word processing application program.

In one embodiment of the invention, the word processing application program is arranged to monitor movement or navigation through the document 117 in response to user commands, and to compare the movement or navigation commands with a set of one or more criteria. In the first example embodiment, if the rate of any given movement exceeds a predetermined threshold, the starting point for the movement is recorded as a return position. A sequence of return points may be logged along the navigation path through a document. The logged return points can be activated by the user via a predefined function key on the keyboard 109, to jump back along the navigation path without having to perform a full reverse sequence of user navigation commands. In the present embodiment, a threshold rate of movement is set as two window lengths per second. In other words, if any one or any combination of user commands result in a movement from a given point within the user interface and the movement exceeds two window lengths in any one second period, then a return point is logged for the point from which the movement was initiated.

Figure 2:
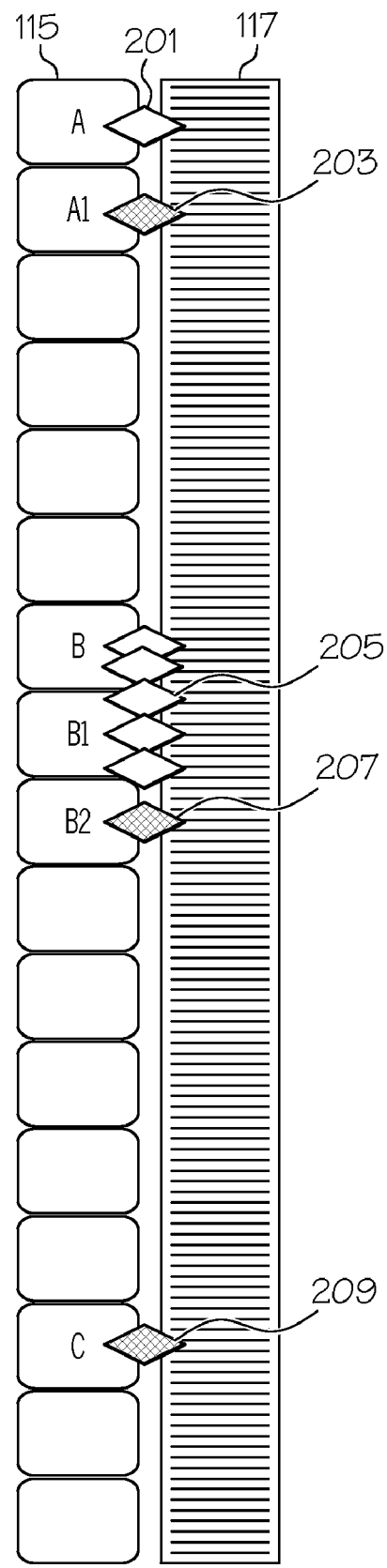
FIG. 2 is a schematic illustration of a navigation process carried out on the computer of FIG. 1.

FIG. 2 shows the document 117 in full length alongside a series of representations of the window 115 in which successive parts of the document 117 can be displayed. When the document 117 is first opened, the first part of the document is displayed at position A. The opening position of the document is recorded as a candidate return point 201 indicated in FIG. 2 by a clear diamond. The document is then navigate according to a user command in the form of a page down command. This results in the viewing position in the document being moved by one window length to a second position. Accordingly, a second part of the document 117 is displayed at a position A1 and the candidate return point 203 is reset to the second position. The document is then navigated according to a user command in the form five successive page down commands. This results in the viewing position in the document being moved by five window lengths to a third position B at a rate greater than two window lengths per second. Since the movement from position A1 to position B was at a greater rate than the movement threshold, the candidate return point 203 recorded at position A1, is designated as an active return point and recorded in a list of such active return points. In FIG. 2, when the candidate return point is designated as an active return point it is shown as a black diamond.

At position B, a third part of the document 117 is displayed and the candidate return point is set to that position. From position B, the document 117 is navigated further in response to successive paragraph jumps through position B1 to position B2. Each paragraph jump is interspersed with a pause in movement above the movement threshold. Thus, at each pause in the navigation, the candidate return point is reset resulting in a succession of candidate return points 205, 207 being recorded. At position B2, the user issues a search command, which results in the navigation of the document 117 jumping six window lengths to position C, with the resulting movement exceeding the movement threshold. Therefore, the last candidate return point 207 is designated as an active return point and recorded in the list of active return points. A further candidate return point 209 is recorded for position C. Subsequently, from position C, the user issues a command to jump to the top of the document at position A which results in the latest candidate return point 209 being designated as another active return point as described above.

The result of the navigation described above with reference to FIG. 2, is a list of active return points 203, 207, 209 for respective positions A1, B2 and C in the document 117. The recorded active return points are accessible to the user via a designated function key on the keyboard 109. In response to the activation of the function key, the navigation of the document 117 is reversed, skipping back along the navigation paths in single steps according to the active return points. For example, from the end position of the navigation at position A, activation of the function key will result in the display position in the document being skipped back along the navigation path to position C in accordance with the last active return point" 209. A further activation of the function key will result in the display position returning to position B2 in accordance with the next latest active return point 207. A further activation of the function key would result in the display position returning to the position A1 in the document 117 in accordance with the first active return point.

Figure 3:
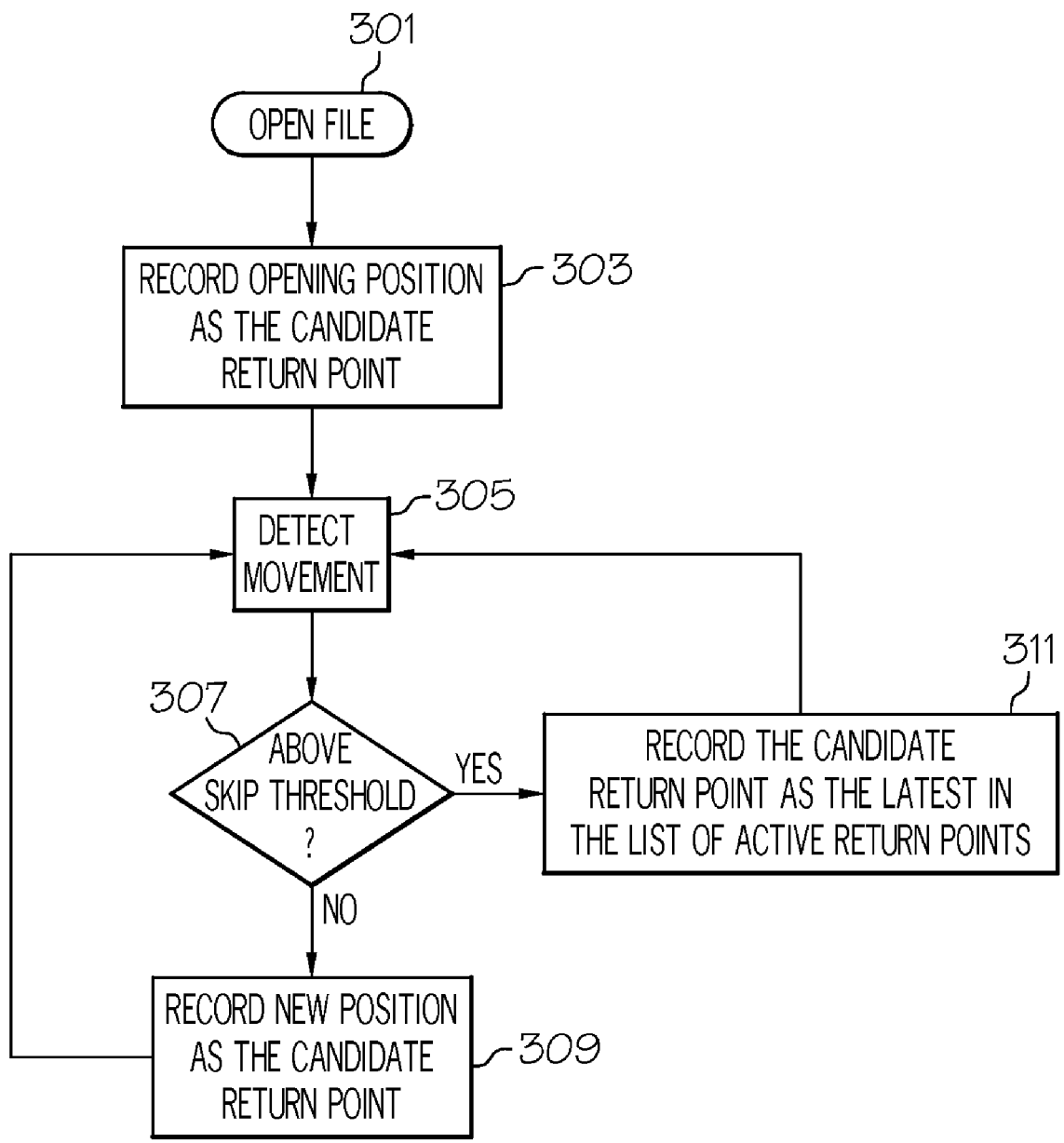
FIG. 3 is a flowchart illustrating processing carried out on the computer of FIG. 1 when conducting the navigation process of FIG. 2.

In the present embodiment, the logging of candidate and active return points is carried out by the word processing application program displaying the document 117. The processing carried out by this program will now be described further with reference to FIG. 3. At step 301, the set of data comprising the document 117 to be displayed is accessed from the storage device 107 and displayed in a new window 115. Processing then moves to step 303 where the opening position of the document is recorded as a candidate return point. Processing then moves to step 305 where processing waits and monitors any movement or navigation within the document 115. If any navigation movement is detected then processing moves to step 307.

At step 307, the end of the detected movement is detected and the rate of movement then calculated. A movement is deemed to have ended after no movement has been detected for a period of one second. If the rate of navigation of the documents is below the two window lengths per second threshold then processing moves to step 309 where the new position is recorded as the candidate return position and processing returns to step 305. If however, at step 307, the rate of navigation exceeds the threshold then processing moves to step 311. At step 311, the last candidate return point is recorded as an active return point. As noted above, active return points can then be accessed via a function key to enable navigation to be effectively reversed to points at which movement through the document paused for at least one second. In other words, the active return points can be used to return to positions in the document which may be of most significant interest to the user—where the user paused for more than one second.

In another embodiment, before the first active return point is recorded, a default active return point is created which corresponds to the initial or opening position in the set of data. This default active return point is set on opening the set of data.' In a further embodiment, the pause time threshold (after which the candidate return point is set if no movement is detected) is set equal to the movement threshold. In another embodiment, the pause time threshold is set to a value greater than the movement threshold. In a further embodiment, the pause time and movement thresholds can be set by the user. In another embodiment, instead of having a pause time threshold, the candidate return point is reset to a given position after any movement is first detected from that position thereby removing the need for a pause time.

In a further embodiment, an additional active return point is recorded at the end of a movement which exceeds the movement threshold. This enables a user to skip back along the navigation path to both the start and end of previously significant or studied areas of the set of data. The mechanism provided for viewing the active return points may enable the user to differentiate between active return points recorded at the start of a movement and those recorded at the end of a movement. This enables a user to skip back to the start or the end of significant areas of the data.

In another embodiment, the movement threshold is determined by the rate of input of a user navigation command. For example, the movement threshold may be set to more than two page down commands per second. A set of thresholds may be defined, each being dependent on a different user navigation command.

In various embodiments of the invention, a return to the last active return point may be performed using a key combination, menu option or toolbar button. The application may be arranged to offer a history of active return points to enable the user to make a selection rather than having to move through a succession active return points. If the user returns to an active return point then this operation may itself result in an active return point being recorded. This would enable a user to toggle between two positions. In a further embodiment, an active return point is removed from the history of active return points once it is returned to. In another embodiment, the active return points can be accessed in time order or in relative position order. This order may be implicit or shown in a history of return points from which a user can select any given active return point to move to.

In general, the above-described embodiments use the criteria of a threshold rate of movement to determine whether a return position should be recorded. In other embodiments, different criteria may be used. For example, one embodiment compares a user-initiated navigation (between first and second positions in a user interface) with a threshold distance. Another embodiment responds to particular navigation commands such as a particular sequence of keyboard key presses (such as 'Ctrl-End' or 'Ctrl-Home', or repeatedly pressing 'Page Up' or 'Page Down' keys).

In one embodiment of the invention, a first position is recorded as a candidate return position when a particular navigation command is used (for example when a computer program detects scrolling, PageDown, or a search/find operation). The movement resulting from that navigation command, or the cadence of key presses performed subsequently by the user, can then be compared with one or more predefined criteria such as a threshold movement distance, number of key presses, or rate of movement. If the movement satisfies the criteria, the candidate return position is recorded as an active return position to which the user can return by invoking a predefined return command. In some embodiments, identification of particular types of navigation command are sufficient to identify a return position as suitable for recording as an active return position without measuring any resulting movement parameters.

In yet another embodiment, thresholds may be adjusted according to detected patterns of user interaction, or personalized by an end user or system administrator by setting the thresholds.

It will be understood by those skilled in the art that the set of data may be one or more documents, web pages or application menus. Furthermore, the mechanism for recording and utilising active return points in the above embodiments may be part of an application program, or provided as an operating system feature, or may be provided by an ancillary program. It will be understood by those skilled in the art that the invention is widely applicable to different types of data processing apparatus. The apparatus that embodies a part or all of the present invention may be a general purpose device such as a desktop or laptop computer, or a small data processing device such as a PDA or mobile telephone. The apparatus may have software installed on the apparatus to provide a part or all of an embodiment of the invention. The software could be a single program or a set of programs. Furthermore, any or all of the software used to implement the invention may be preloaded on a device or communicated via various transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details of the example apparatus, methods and programs described above or shown in the drawings. Accordingly, departures may be made from such details without departure from the spirit or scope of applicant's general inventive concept.

The invention claimed is:

1. A computer implemented method for navigating within a user interface of a data processing apparatus, the computer implemented method comprising:
   a processor associating successive parts of a document with different windows, wherein the document comprises the successive parts arranged in a predefined sequential order, and wherein each successive part is displayed in a different window on a user interface;
   the processor detecting a user-initiated navigation instruction for navigating directly from a first part of the document to a second part of the document, wherein the second part of the document is not displayed on the user interface until the first part of the document has been displayed on the user interface, and wherein the first and second parts of the document are separated by at least one intermediate part of the document;
   the processor recording a position of the first part of the document to enable a user to return to the position of the first part of the document from the second part of the document by initiating a predefined return instruction;

the processor measuring a first length of time, wherein the first length of time is a length of time taken to navigate from the first part of the document to the second part of the document;

the processor measuring a second length of time, wherein the second length of time is a length of time that the second part of the document is displayed on the user interface after navigating from the first part of the document: and in response to the first length of time being less than the second length of time, recording the position of the first part of the document.

2. The computer implemented method according to claim 1, wherein the user-initiated navigation instruction is a jump from the first part of the document to the second part of the document without displaying said at least one intermediate part of the document.

3. The computer implemented method according to claim 1, further comprising:

in response to the first length of time equaling the second length of time, recording the position of the first part of the document.

4. The computer implemented method according to claim 1, wherein a minimum actionable length for the second length of time is set by a user of the user interface, and wherein the minimum actionable length must be reached before the position of the first part of the document is recorded by the processor.

5. The computer implemented method according to claim 2, wherein the jump from the first part of the document to the second part of the document is caused by an execution of a search instruction to search for a term in the second part of the document.

6. The computer implemented method according to claim 2, wherein the first part of the document and the second part of the document are components of a text document.

7. The computer implemented method according to claim 6, wherein the jump from the first part of the document to the second part of the document is caused by an execution of a Ctrl-End instruction.

8. The computer implemented method according to claim 1, further comprising:

the processor marking a start position of the first part of the document;

the processor receiving an instruction to return from the second part of the document to the start position of the first part of the document; and the processor displaying the first part of the document at the start position.

9. The computer implemented method according to claim 1, further comprising:

the processor marking an end position of the first part of the document;

the processor receiving an instruction to return from the second part, of the document to the end position of the first part of the document; and the processor displaying the first part of the document at the end position.

10. A computer program product for navigating within a user interface of a data processing apparatus, the computer program product comprising:

a computer readable storage medium having computer readable program code embodied therewith, the computer readable program code comprising:

computer readable program code to associate successive parts of a document with different windows, wherein the document comprises the successive parts arranged in a predefined sequential order, and wherein each successive part is displayed in a different window on a user interface;

computer readable program code to detect a user-initiated navigation instruction for navigating directly from a first part of the document to a second part of the document, wherein the second part of the document is not displayed on the user interface until the first part of the document has been displayed on the user interface, and wherein the first and second parts of the document are separated by at least one intermediate part of the document; and computer readable program code to record a position of the first part of the document to enable a user to return to the position of the first part of the document from the second part of the document by initiating a predefined return instruction;

computer readable program code to measure a first length of time, wherein the first length of time is a length of time taken to navigate from the first part of the document to the second part of the document;

computer readable program code to measure a second length of time, wherein the second length of time is a length of time that the second part of the document is displayed on the user interface after navigating from the first part of the document; and computer readable program code to, in response to the first length of time being less than the second length of time, record the position of the first part of the document.

11. The computer program product of claim 10, wherein the user-initiated navigation instruction is a jump from the first part of the document to the second part of the document without displaying said at least one intermediate part of the document.

12. The computer program product of claim 11, wherein the jump from the first part of the document to the second part of the document is caused by a search for a term in the second part of the document.

13. The computer program product of claim 10, further comprising:

computer readable program code to mark a start position of the first part of the document;

computer readable program code to receive an instruction to return to the start position of the first part of the document; and computer readable program code to display the first part of the document at the start position.

14. The computer program product of claim 10, further comprising:

computer readable program code to mark an end position of the first part of the document;

computer readable program code to receive an instruction to return to the end position of the first part of the document; and computer readable program code to display the first part of the document at the end position.

15. A computer system comprising:

a processor, a computer readable memory, and a computer readable storage media;

first program instructions to associate successive parts of a document with different windows, wherein the document comprises the successive parts arranged in a predefined sequential order, and wherein each successive part is displayed in a different window on a user interface;

second program instructions to detect a user-initiated navigation instruction for navigating directly from a first part of the document to a second part of the document, wherein the second part of the document is not displayed on the user interface until the first part of the document has been displayed on the user interface, and wherein the first and second parts of the document are separated by at least one intermediate part of the document; and third program instructions to record a position of the first part of the document to enable a user to return to the position of the first part of the document from the second part of the document by initiating a predefined return instruction;

fourth program instructions to measure a first length of time, wherein the first length of time is a length of time taken to navigate from the first part of the document to the second part of the document;

fifth program instructions to measure a second length of time, wherein the second length of time is a length of time that the second part of the document is displayed on the user interface after navigating from the first part of the document; and sixth program instructions to, in response to the first length of time equaling the second length of time, record the position of the first part of the document, and wherein the first, second, third, fourth, fifth, and sixth program instructions are stored on the computer readable storage media for execution by the processor via the computer readable memory.

16. The computer system of claim 15, wherein the user-initiated navigation instruction is a jump from the first part of the document to the second part of the document without displaying said at least one intermediate part of the document.

17. The computer system of claim 16, wherein the jump from the first part of the document to the second part of the document is caused by a search for a term in the second part of the document.

18. The computer system of claim 15, further comprising:
seventh program instructions to mark a start position of the first part of the document;
eighth program instructions to receive an instruction to return to the start position of the first part of the document; and
ninth program instructions to display the first part of the document at the start position; and wherein
the seventh, eighth, and ninth program instructions are stored on the computer readable storage media for execution by the processor via the computer readable memory.

19. The computer system of claim 15, further comprising:
seventh program instructions to mark an end position of the first part of the document;
eighth program instructions to receive an instruction to return to the end position of the first part of the document; and
ninth program instructions to display the first part of the document at the end position; and wherein
the seventh, eighth, and ninth program instructions are stored on the computer readable storage media for execution by the processor via the computer readable memory.

* * * * *